Figure 2:
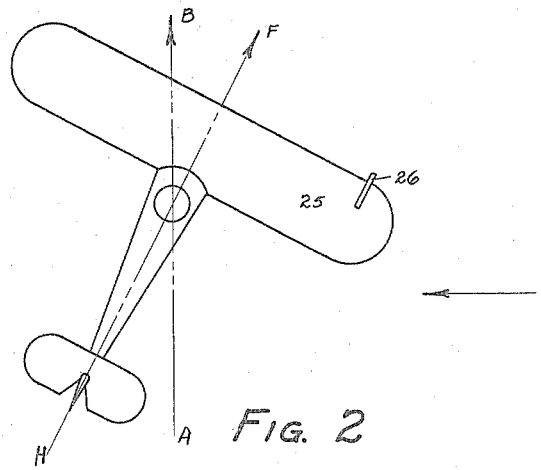

June 24, 1941. G. E. UNDERWOOD 2,246,555
RELATIVE WIND INDICATING MEANS FOR AIRCRAFT
Filed April 18, 1938 7 Sheets-Sheet 1

INVENTOR
Gates E. Underwood
BY
ATTORNEY

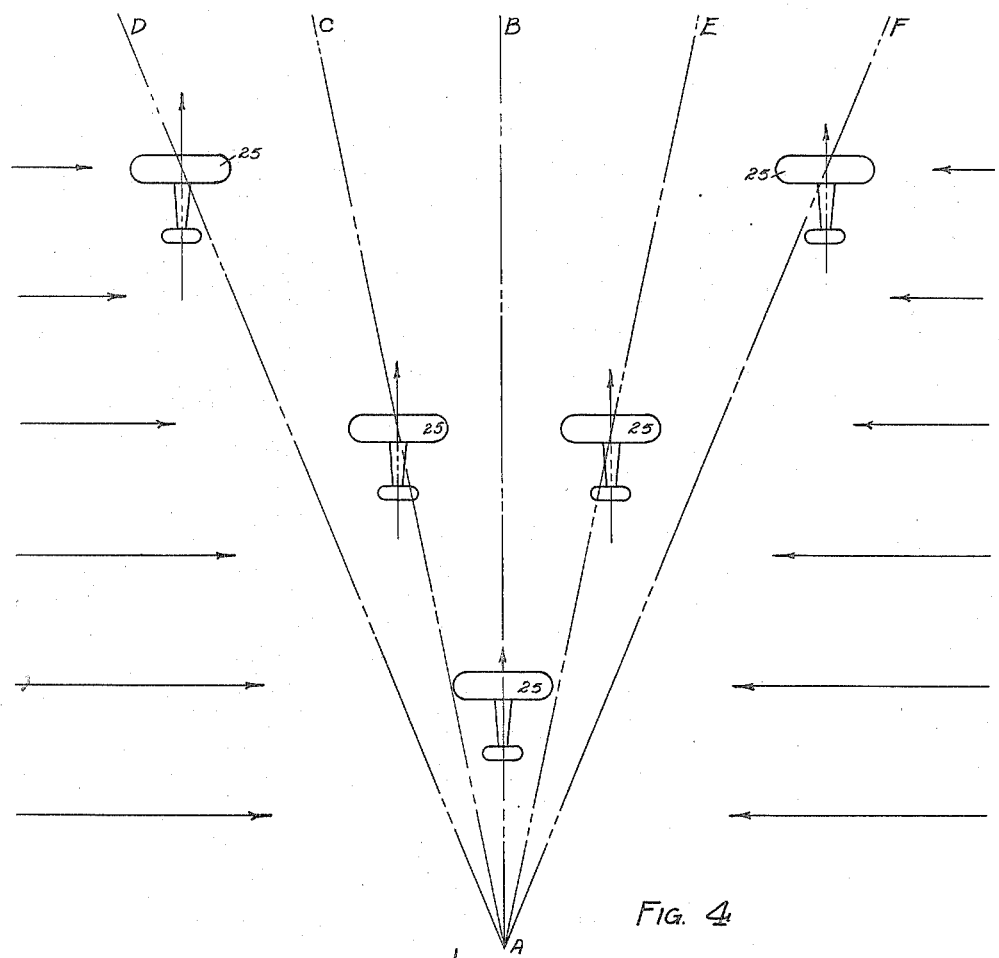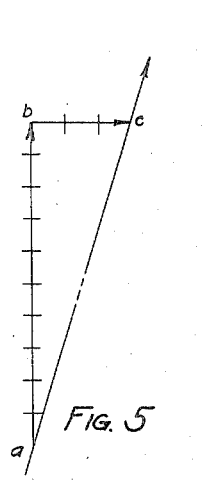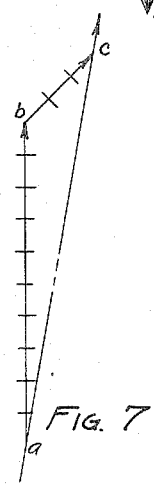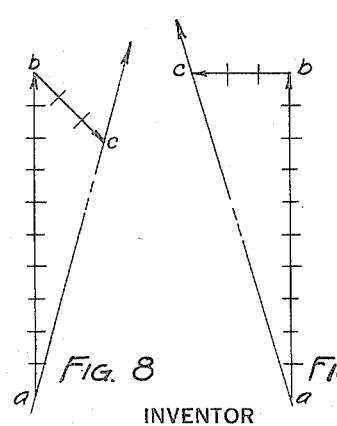

June 24, 1941.   G. E. UNDERWOOD   2,246,555
RELATIVE WIND INDICATING MEANS FOR AIRCRAFT
Filed April 18, 1938   7 Sheets-Sheet 3

INVENTOR
Gates E. Underwood
BY
ATTORNEY

June 24, 1941.    G. E. UNDERWOOD    2,246,555
RELATIVE WIND INDICATING MEANS FOR AIRCRAFT
Filed April 18, 1938    7 Sheets-Sheet 4

INVENTOR
Gates E. Underwood
BY
ATTORNEY

June 24, 1941.   G. E. UNDERWOOD   2,246,555
RELATIVE WIND INDICATING MEANS FOR AIRCRAFT
Filed April 18, 1938   7 Sheets-Sheet 7

INVENTOR
Gates E. Underwood
BY
ATTORNEY

Patented June 24, 1941

2,246,555

UNITED STATES PATENT OFFICE 2,246,555

RELATIVE WIND INDICATING MEANS FOR AIRCRAFT

Gates E. Underwood, Rock Springs, Wyo., assignor to The Underwood Development Company Rock Springs, Wyo., a corporation of Wyoming Application April 18, 1938, Serial No. 202,754

3 Claims. (Cl. 73—180)

This invention relates to and is concerned with the operation and navigation of air craft, and more particularly the navigation of heavier-than-air craft of air plane type, and has as an object to provide means for facilitating on-course navigation of such craft through winds and air currents normally tending to drift the craft off-course.

A further object of the invention is to provide means in association with an air craft operable to indicate the direction and effective amplitude of wind forces tending to drift said craft off-course.

A further object of the invention is to provide an improved relative wind indicator for air craft directly responsive to the relative wind forces productive of drift effect on said craft.

A further object of the invention is to provide improved drift-indicating means for air craft which is operable to determine the directional heading of such craft for on-course flight through wind conditions normally productive of off-course drift.

A further object of the invention is to provide an improved construction and arrangement of elements constituting relative wind indicating means for air craft.

A further object of the invention is to provide an improved construction and arrangement of apparatus constituting relative wind indicating means wherethrough the effective direction and effective amplitude of wind productive of drift of such craft may be directly evidenced to the operator of the craft.

A further object of the invention is to provide improved means of automatically interpreting drift-producing relative wind effect acting on an air craft in terms of drift ratios and required corrective directional headings readable by the craft operator.

A further object of the invention is to provide improved indicator instrument means in automatic, operative association with relative wind responsive means carried by an air craft.

A further object of the invention is to provide an improved, electrically-coupled combination of relative wind responsive means and indicating instrument means associated with an air craft, whereby the relative winds productive of drift effect on such craft are automatically indicated in direction and amplitude to the operator of the craft.

A further object of the invention is to provide an improved relative wind indicating means for air craft which is relatively simple and inexpensive of manufacture and operation; which is susceptible of convenient operative association with air craft of varying types and constructions; which is light in weight; which is positive and efficient in fully automatic operation; and which may be readily adapted through various specific indicating instruments to translate relative wind effects into terms readable by the craft operator to facilitate the compensations necessary for maintenance of on-course flight.

My invention consists in the construction, combination, and arrangement of elements hereinafter set forth, pointed out in my claims, and illustrated by the accompanying drawings, in which—

Figure 1:
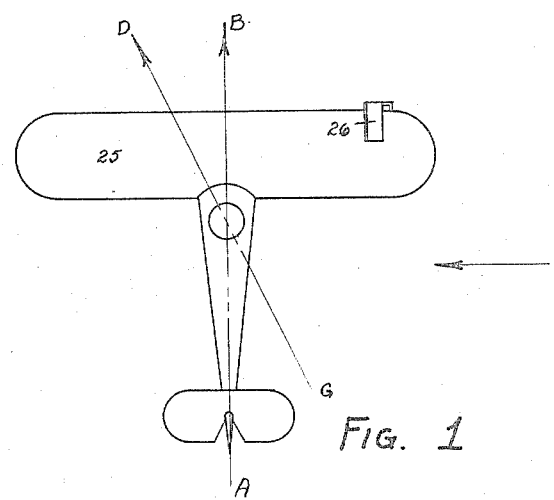
Figure 3:
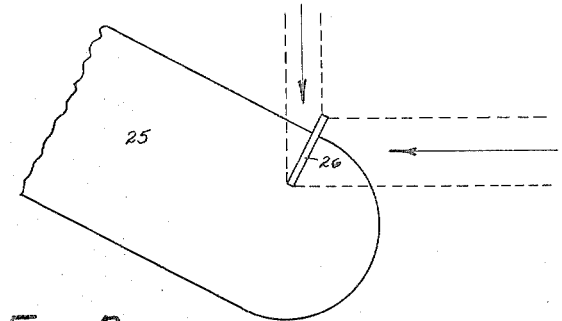
Figure 9:
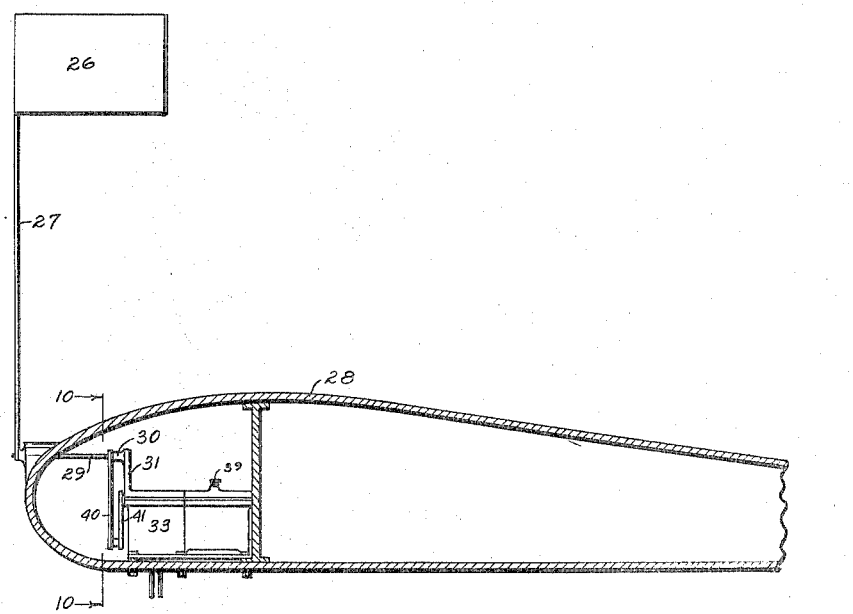
Figure 10:
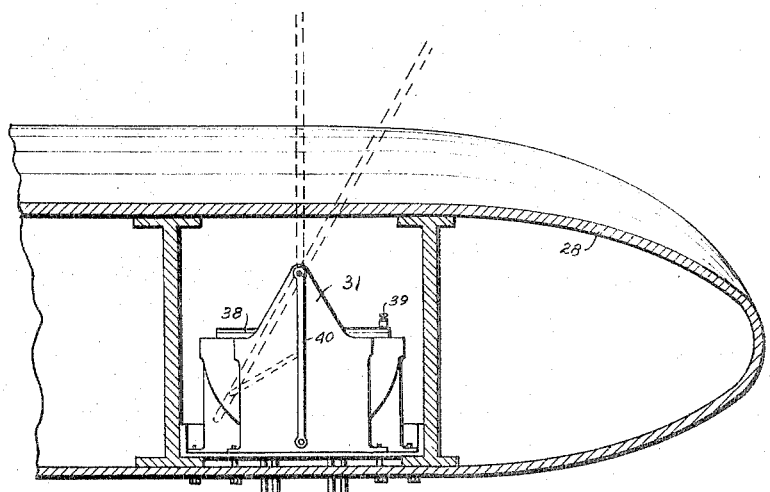
Figure 11:
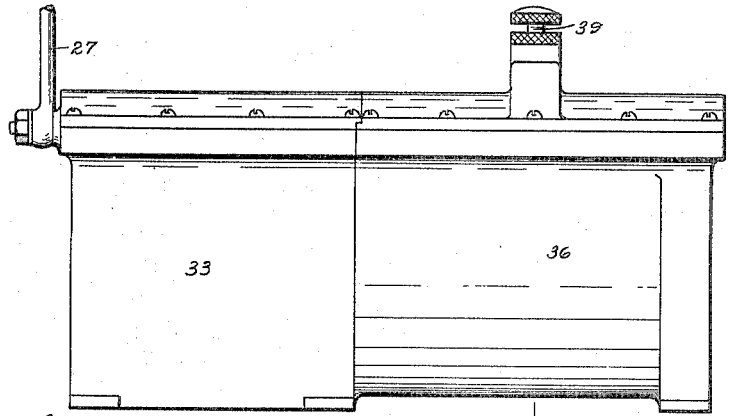
Figure 12:
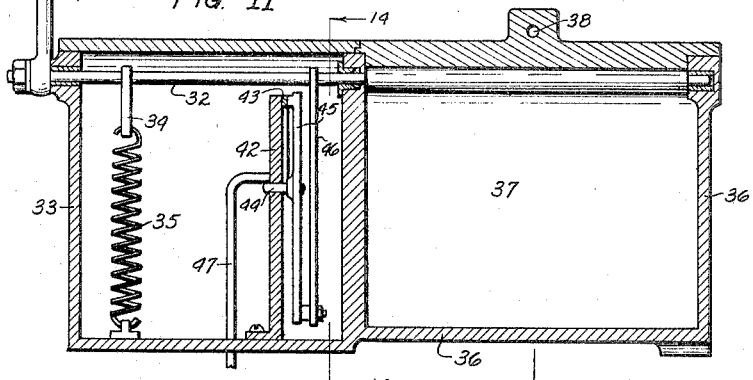
Figure 13:
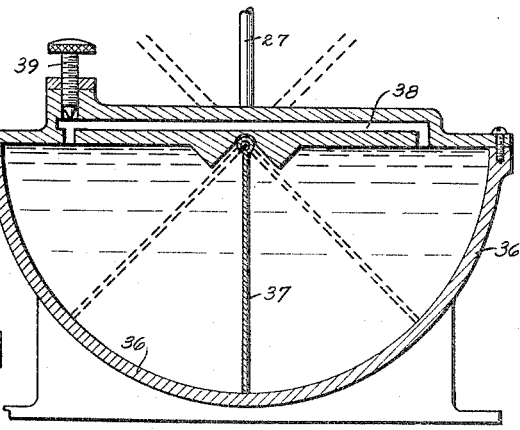
Figure 14:
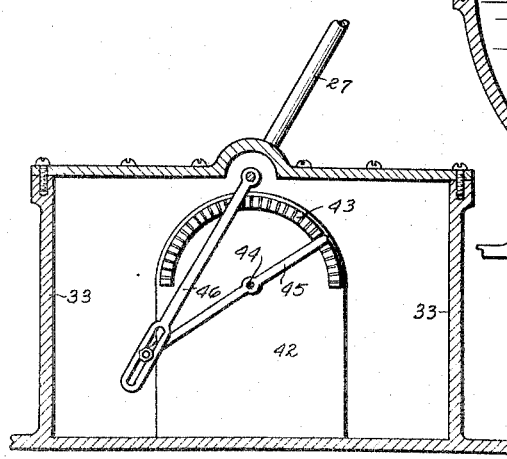
Figure 15:
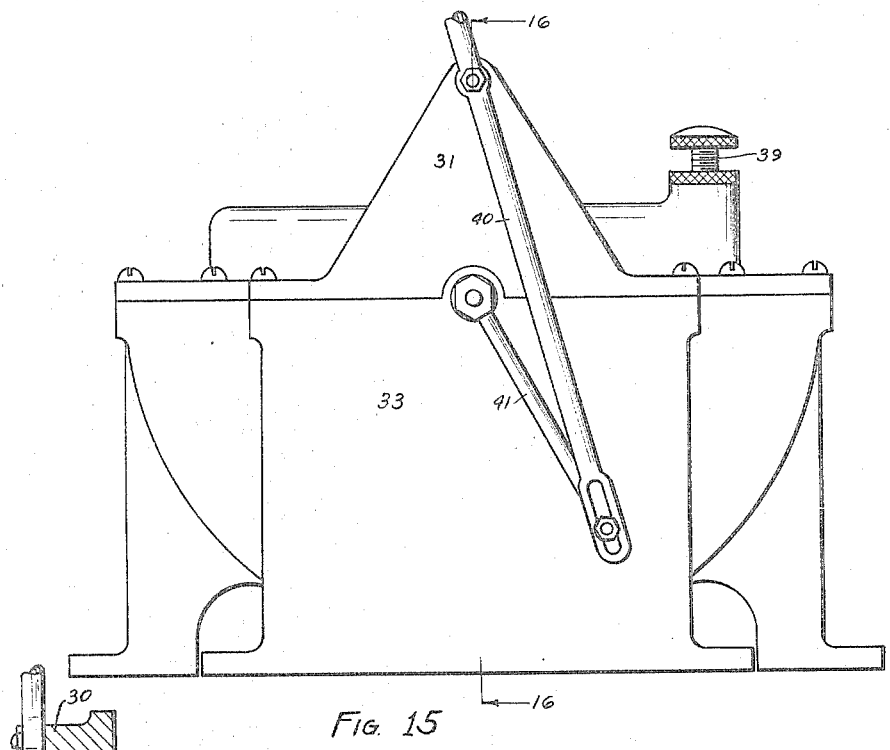
Figure 16:
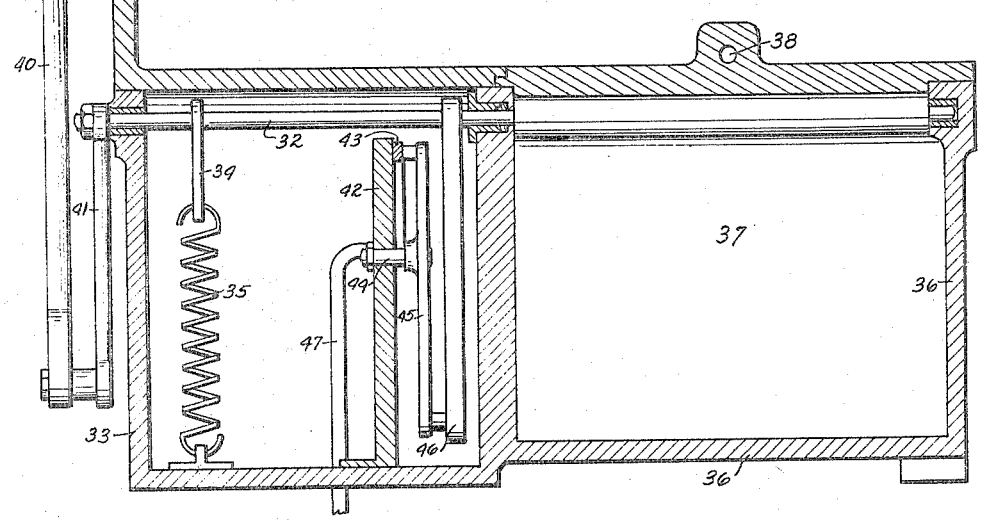
Figure 17:
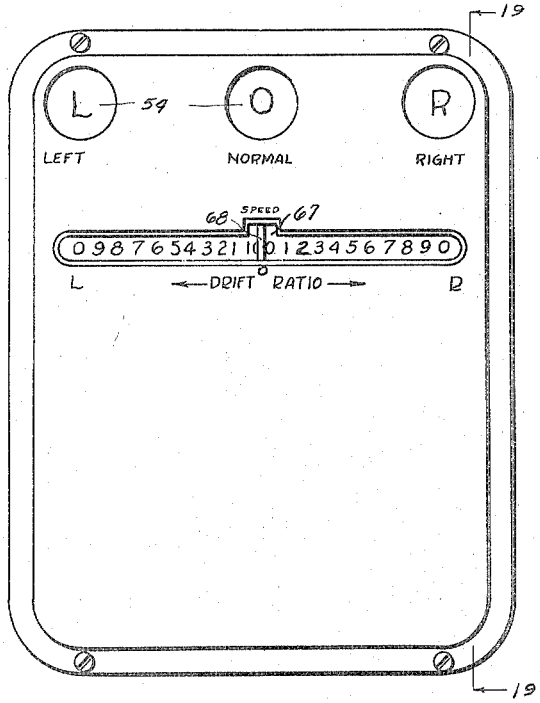
Figure 19:
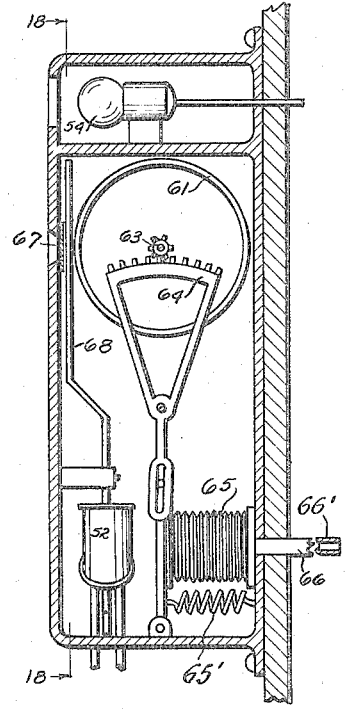
Figure 18:
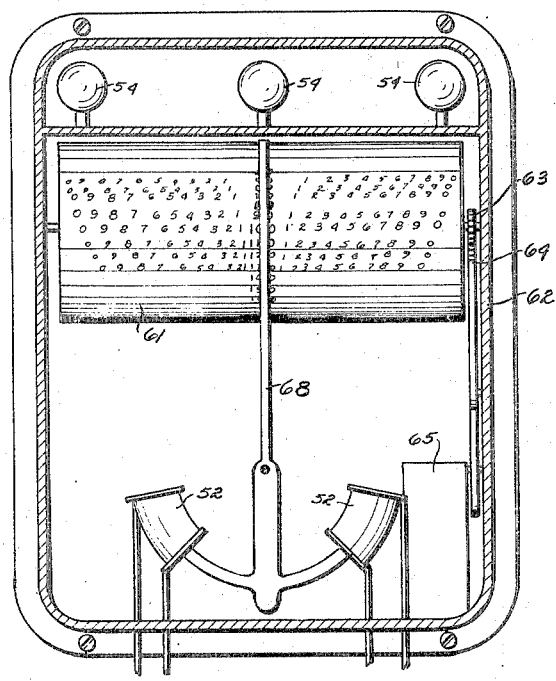
Figure 23:
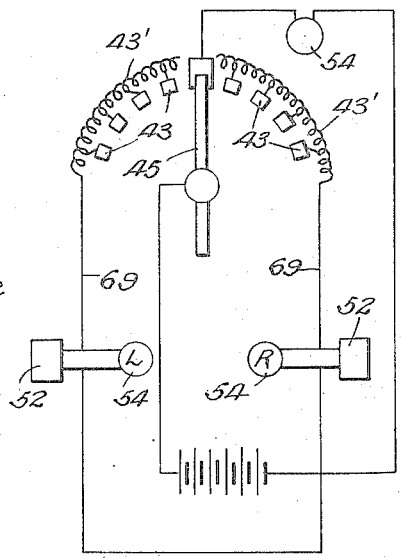
Figure 20:
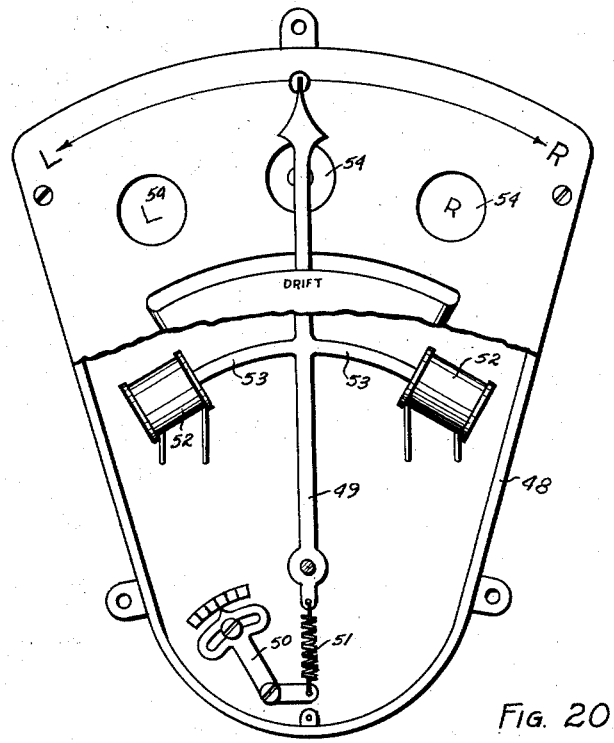
Figure 22:
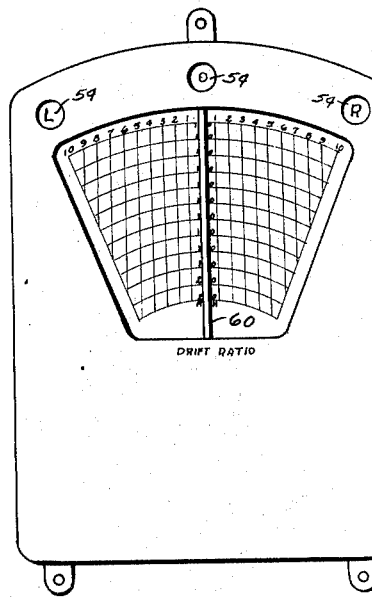
Figure 21:
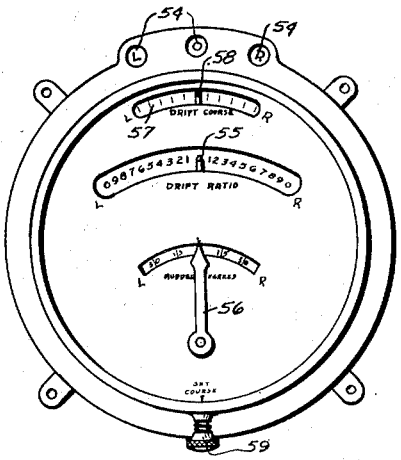

Figure 1 is a diagrammatic representation of a conventionalized air plane flying an on-course heading under the influence of a cross or side wind. Figure 2 is a view similar to Figure 1 illustrating the correction of directional heading of the air craft necessary for on-course flight under the conditions shown in Figure 1. Figure 3 is a fragmentary, detail diagram illustrating the forces acting upon a movable vane element of the invention when the craft equipped therewith is in the corrected relation shown in Figure 2. Figure 4 is a diagram illustrating the effect of cross or side winds on air craft flying on-course headings. Figures 5, 6, 7, and 8, are diagrams illustrating the direction and relative lengths of the flight paths traversed by air craft flying on-course headings under the influence of side and quartering winds. Figure 9 is a transverse section of a conventional airfoil wherewith the wind-responsive elements of the invention are operatively associated. Figure 10 is an enlarged view, partly in section, of the elements shown in Figure 9 and taken on the indicated line 10—10 of said latter figure. Figure 11 is a side elevation of a modified construction and arrangement of mounting for a wind-responsive element and means associated therewith. Figure 12 is a section longitudinally of the showing of Figure 11. Figure 13 is a cross section taken on the indicated line 13—13 of Figure 12. Figure 14 is a cross section taken on the indicated line 14—14 of Figure 12. Figure 15 is a front end elevation, on an enlarged scale, of the wind-responsive element mounting and associated elements shown in Figures 9 and 10. Figure 16 is a longitudinal section taken on the indicated line 16—16 of Figure 15. Figure 17 is an elevation of a combined speed and relative wind indicating instrument arranged for advantageous operative association with the other elements of the invention. Figure 18 is a section taken on the indicated line 18—18 of Figure 19 to illustrate interior arrangement of the operative elements constituting the indicator shown in Figure 17. Figure 19 is a section taken on the indicated line 19—19 of Figure 17. Figure 20 is a front elevation, partly in section, of an alternative relative wind-indicating instrument advantageously employable with the invention. Figure 21 is a front elevation of still another alternative relative wind-indicating instrument associated with means operable to facilitate on-course navigation of the air craft. Figure 22 is a front elevation of yet another alternative arrangement of relative wind-indicating instrument employable with and to give visual effect to the operation of other elements of the invention. Figure 23 is a conventionalized wiring diagram of circuits which may conveniently be employed in operatively associating the elements of the invention.

The diagrammatic showing of Figure 4 illustrates the effect of winds perpendicular to the flight path of a typical heavier-than-air craft 25. Such an air craft flying in the direction A—B will traverse a line of flight corresponding to said line A—B when unaffected by winds other than those parallel to its line of flight. However, maintenance of the craft heading, by reference to compass or like direction-determining means, to correspond with the original flight path A—B when flying through moving air or winds having directions not parallel with the line of flight results in a displacement of the craft from its proposed flight path in the manner shown in the diagram, relatively moderate winds perpendicular to the proposed flight path and approaching from the right resulting in an actual flight path corresponding to the line A—C and relatively stronger winds from the same direction being productive of an actual flight path corresponding to the line A—D, while corresponding winds from the opposite direction are productive of the flight paths A—E and A—F, the amount of deviation from the proposed flight path being a function of both the wind velocity and wind direction. Figures 5, 6, 7, and 8 illustrate diagrammatically in terms of actual ground speed and direction the actual flight paths traversed by the craft 25 of Figure 4 when affected by winds of uniform velocity but from different directions while the craft maintains a heading corresponding to the proposed flight path. In all of the diagrams the proposed flight path is represented in terms of speed and direction by the vector $a$—$b$, the wind speed and direction by the vector $b$—$c$, and the speed and direction of the path actually flown by the resultant $a$—$c$, the diagram of Figure 5 evidencing the actual flight path of a craft headed parallel to the line $a$—$b$, flying at a speed of one hundred miles per hour through a wind having a velocity of thirty miles per hour and approaching the flight path perpendicular from the left; Figure 6 illustrating conditions identical with those shown in Figure 5 save that the wind direction is directly opposite to that shown in Figure 5; Figure 7 illustrating flight and wind conditions identical with those shown in Figure 5 save that the wind direction is quartering and approaches the craft from the left rear; while Figure 8 illustrates a flight and wind condition identical with the showing of the other diagrams with the difference that the wind direction is quartering and approaches the craft from the left front. From the foregoing, and particularly from a comparison of the resultants $a$—$c$ representing the actual flight paths of a craft under varying wind conditions, it is immediately apparent that a determination of the relative wind direction and velocity is an essential for proper navigation of such craft, and most particularly vital for accurate navigation of air craft under conditions of limited or negative visibility.

Figures 1, 2 and 3 illustrate diagrammatically the operative principle of the instant invention. Figure 1 shows a conventional craft 25 headed along a flight path A—B under the influence of a cross wind approaching the craft from the right to produce a craft drift resulting in an actual flight path G—D. The craft carries a panel or vane 26 mounted for actuation through a vertical arc laterally of the craft and about an axis parallel with the longitudinal axis or directional heading of the craft, so that said vane 26 normally presents a narrow edge portion in the direction of craft heading and its major surface area aligned in trailing relation with the air stream developed through craft flight and in position for reaction to relative winds approaching said craft from any direction other than along the path corresponding to the craft heading, so that, under the conditions indicated in Figure 1, the drift or cross wind approaching as shown acts against the vane 26 to move the latter relative to its supporting craft and about its mounting axis a distance proportional to the effective velocity of said relative wind. Under the conditions illustrated by Figure 1, wherein the desired flight path is represented by the line A—B, the amount and effective direction of the drift-producing relative wind is indicated and, in fact, measured by the direction and amplitude of travel of the vane 26 about its mounting axis, at least until the craft attains a drift velocity approximating that of the relative wind, which displacement from normal position may be caused to actuate means readily readable by the craft operator in terms of course deviation or drift effect. When definite relative wind data is thus available, the craft controls may be operated to change the directional heading of the craft as indicated in Figure 2, the change in heading being such as to direct the flight along a path H—F wherein the flight and drift forces balance to maintain an actual flight path along the line A—B. When the craft heading has been corrected to compensate for drift effect of the relative wind, one side of the vane 26 is exposed in the direction of actual forward travel of the craft while the other side of said vane is still exposed, but to a lesser degree, to the drift-producing wind, in which event the forces thus acting on opposite sides of said vane 26 may be brought into balance to return said vane to normal perpendicular relation with the plane containing the longitudinal and transverse axes of the craft, as is clearly shown in Figure 3, the relatively greater air forces produced through craft flight acting on a relatively lesser projected area of the vane for balance against relatively lesser drift forces acting against a relatively greater projected vane area.

The relative-wind-responsive vane or panel 26 may be operatively associated with the craft structure for actuation of suitable measuring and indicating means in a variety of structurally specific manners, certain structural assemblies and relationships operable to give practical effect to the principles of the invention being illustrated in Figures 9 to 16, inclusive, and hereinafter described. For accurate proportional reaction of the vane 26 to drift-producing winds and air currents, it is important that said vane be positioned out of the zone of air disturbance produced by craft flight and remote from propeller slip-streams, and the like, to which end the vane 26 is preferably fixed to one end of a supporting arm or stem 27 which is fixed at its other end to and in upstanding relation above a mounting axis disposed in parallel relation with the craft flight axis and preferably positioned adjacent the leading edge of an outer end or tip portion of a craft wing or airfoil 28, thus positioning the vane 26 laterally away from air disturbances deriving from engine, propeller, and fuselage portions of the craft, forwardly of and above the zones of air disturbance produced by travel of the craft wings, and for oscillation about its mounting axis through an arc perpendicular to the flight axis of the craft. The mounting axis for the vane 26 may be in the form of a suitably-journaled shaft 29 mounted within the wing structure and projecting forwardly therethrough for connection of its forward end with the stem 27, as is shown in Figure 9, or may be housed entirely within the wing structure in the form of a stud or pin 30 in fixed, forwardly-projecting relation with a bracket member 31, in the manner indicated in Figures 15, and 16, in which event the stem 27 would be directly pivoted to the element 30 and project upwardly therefrom through a suitable slot or opening in the wing cover, or may take the form illustrated in Figures 11–14, wherein the lower end of the stem 27 connects directly with an operating shaft 32 associated with further elements of the invention and suitably housed within the wing structure in parallel relation with the craft flight axis, the particular means employed to operatively mount the vane 26 and its stem 27 on and for oscillation relative to the craft being of little importance so long as the vane 26 is positioned for free reaction to the relative winds affecting the craft and for oscillation about an axis parallel with the craft flight path.

For obvious practical reasons, it is important that means be provided to normally position and maintain the stem 27 with its attached vane 26 in upstanding, substantially vertical relation above its supporting wing structure, as well as means to smoothly retard the reaction of the vane 26 to winds and air currents for the purpose of damping out minor and temporary oscillations deriving from other than drift-producing sources. Referring to Figures 11, 12, and 13, wherein the stem 27 is shown as directly connected to and in fixed relation with one end of an operating shaft 32, said shaft 32 is shown as mounted for rotation within and in horizontal traversing relation adjacent the upper portion of a suitable housing 33 defining an interior chamber and adapted for mounting within a wing structure in such manner as to position the shaft 32 in parallel relation with the craft flight axis. A radial arm 34 is fixed to the shaft 32 in depending relation within the chamber defined by the housing 33 and in oppositely-extending alignment with the stem 27, the depending end of said arm 34 being operatively engaged by one end of a retractile spring element 35 which connects at its other end to a fixed point on the floor of the housing 33, so that any rotation of the shaft 32 acts through the arm 34 to increase the tension in the spring 35 for automatic return of said arm 34 to its vertically-depending position within the housing 33, which position corresponds with a normal vertical position of a stem 27 when the craft is laterally horizontal. The spring 35 should be adjusted to a tension only sufficient to maintain the stem 27 in its vertical, normal position so that said spring will interpose a minimum of resistance to oscillation of the vane 26 responsive to drift-producing air currents. It will be apparent that the arrangement just above described will function to return the stem 27 to normal position from either direction of its oscillation. Rearwardly of and immediately adjacent the chamber defined by the housing 33, a suitable casing or housing 36 defines a semi-cylindrical chamber in axial alignment with the shaft 32, the cylindrical portion of said latter chamber being disposed beneath the projected axis of said shaft. The shaft 32 is extended in traversing relation across said semi-cylindrical chamber and suitably journaled for rotation relative to said chamber, a radial piston 37 being fixed to the extended portion of said shaft 32 and thereby mounted in radially-obstructing relation with and across said semi-cylindrical chamber. The piston 37 is preferably aligned in the plane containing the axes of the stem 27 and shaft 32, so that when said stem is in its normal, vertical position, said piston is likewise vertically disposed in bisecting relation with the semi-cylindrical chamber wherein it is housed. The portions of the semi-cylindrical chamber on opposite sides of the piston 37 are placed in communication with each other by means of a relatively small by-pass conduit or passage 38 wherewith is operatively associated a suitable, manually-adjustable, valve element 39 arranged for adjustment to vary the effective size of the by-pass. The semi-cylindrical chamber within the housing 36 is suitably closed and sealed against leakage to enclose a charge of suitable liquid, such as oil, substantially filling said chamber on both sides of the piston 37, so that oscillation of said piston within said chamber is resisted by said liquid charge and is permitted only as liquid on one side of said piston is caused to flow through the by-pass 38 and into the portion of the chamber on the other side of the piston, the rate of such flow being controllable through manipulation of the valve 39. This operative arrangement of elements serves to damp out minor oscillations of the vane 26 and stem 27 and eliminates erratic reactions of the pressure-responsive means, while permitting smoothly-developed, complete reaction of said vane and stem to air currents having force and persistency sufficient for drift effect. When the stem 27 is mounted as shown in Figures 9, 15, and 16, the bracket 31 may rise in fixed relation from the forward end of the casing 33 to support the pin or stud 30 or the rearward end of the shaft 29, as the case may be, an extension arm 40 being fixed to the shaft 29 or stem 27 to project downwardly from the stem mounting across the forward end of the casing 33 for pivotal link connection with a radial arm 41 fixed to the forward end of the shaft 32, the other elements of the positioning and damping assembly being identical with those above described. The pivotal link connection between the stem 27 and shaft 32 has an advantage in that lesser travel of the vane 26 and stem 27 is productive through the pivotal link connection of relatively greater travel or angular displacement of the shaft 32 and its attached elements, which arrangement makes possible closer readings and more accurate drift indications than may be conveniently obtained when the stem 27 is fixed directly to the end of shaft 32.

The arrangement thus far described provides means for discovering and measuring drift-producing air currents affecting air craft in flight, initial oscillations of the vane 26 away from its normal position and consequent angular displacements of the shaft 32 being proportional to the effective magnitude of the drift-producing currents, and it is hence possible to utilize either the oscillation of the vane 26 or the angular displacement of the shaft 32 as a measure of the forces whereof determination is sought. Since the pressure-responsive assembly is necessarily remote from the position of the craft operator and hence undesirably located for direct visual observation, it is eminently desirable to operatively associate suitable indicating means with the pressure-responsive assembly and in readily-readable relation with the craft operator. This may conveniently be done through a wide variety of specific installations, and is perhaps best accomplished through the use of electrically-actuated indicating means mounted on the instrument panel of the craft in electrical association with the pressure-responsive elements of the measuring assembly. Figures 12, 14, and 16 conventionally illustrate automatic electric switch or control means in operative association with the shaft 32 for the actuation of indicating means or meters shown in Figures 17–22, and hereinafter described. The automatic switch or control means is illustrated as comprising a panel 42 rising in fixed, transverse relation within the casing 33 beneath the shaft 32 and adjacent the spring 35, which panel supports a plurality of uniformly-spaced, electric contact points 43 arcuately disposed about a pivotal center 44 carried by the plate 42 whereon is mounted a swingable switch arm or contact member 45 disposed for successive engagement of its free end with the contacts 43 as said switch arm is moved about its pivot. An arm 46 is fixed to the shaft 32 and depends therefrom adjacent the switch arm 45, an extension of the latter pivotally and slidably connecting with the free end of the arm 46 so that arcuate travel of the latter acts to effect arcuate travel of the arm 45 relative to the contact points 43. The arm 46 is so associated with the shaft 32 and with the switch arm 45 as to position the latter at the midpoint of the line of contacts 43 when the stem 27 is in its normal vertical relation and unaffected by drift-producing currents, which arrangement permits oscillation of the stem 27 and consequent angular displacement of the shaft 32 to move the switch arm 45 about its pivot for travel of its free end in contacting relation across the contacts 43 in a direction corresponding to and in an amount proportional with the actuating oscillation of the stem 27. The contacts 43 are divided at their midpoint for connection of said contacts on one side of the point of division with a suitable coil or resistance element 43' in a manner to increase flow of current in a circuit 69 as the switch arm moves away from its neutral position, while the contacts on the other side of said midpoint are likewise connected with a separate coil or electrical unit for increase in flow of current as said switch arm moves across said points away from its neutral position, the electrical connections to said coils or units necessary to complete an electrical circuit for actuation of indicating devices hereinafter described being indicated by the representation of a cable designated at 47, and shown diagrammatically in Figure 23.

A simple form of indicating instrument adapted for mounting on the instrument panel of an air craft in operative association with the pressure-responsive assembly hereabove described is illustrated in Figure 20. As shown, this instrument comprises a suitable casing 48 wherein is pivotally mounted a pointer or indicating member 49 disposed for actuation transversely of the casing and to right or left of a midpoint representing the neutral or no-drift instrument reading. An adjustable bell-crank 50 is mounted within the casing 48 and connects through a retractile coil spring 51 with an extension of the pointer 49 and provides means for adjustably positioning and normally maintaining the pointer in coincidence with its no-drift indication. Solenoid coils 52 are mounted within the casing 48 on opposite sides of the pointer 49 for separate, operative connection with corresponding groups of the contacts 43 in such manner that travel of the switch arm 45 across the contacts 43 will serve to energize the corresponding coil 52 to a degree proportional to the amount of switch arm travel. The coils 52 are hollow and are positioned to be axially traversed by movable core elements 53 fixed to and extending outwardly from opposite sides of the pointer 49, so that energization of a coil 52 acts to draw its corresponding core element 53 axially within the coil in proportion to the current flow as controlled by the resistance 43' and thereby move the pointer 49 to a visual indication corresponding in direction and amplitude to the direction and amplitude of oscillation of the vane 26 under the influence of drift-producing air currents. The casing 48 may conveniently house light bulbs 54 arranged and connected for illumination in response to variations of the pointer 49, one of said bulbs being disposed for illumination while the pointer remains in its neutral position and others of said bulbs being disposed on opposite sides of the first bulb for illumination as the pointer moves from right to left, respectively, as is clearly shown in the drawing.

Figure 21 illustrates the face of a drift indicating and navigation instrument wherein a pointer 55 is mounted to react in the manner described for the pointer 49 in traversing relation with indicia representing a ratio of drift to craft speed, whereby the magnitude or velocity of drift may be readily determined. This instrument includes a secondary pointer 56 in rigidly-connected operative association with the pointer 55 and disposed to traverse indicia indicating degress of rudder setting whereby directional correction of the craft course to compensate for drift effect is facilitated, and the instrument further includes an adjustable or "dummy" compass 57 in association with a third pointer 58 also rigidly connected with the pointer 55, which compass may be adjusted to a course reading by means of a suitable nut 59 for check against the pointer 58 as a navigational aid. The instrument according to Figure 21 may include the light bulbs 54 positioned in the manner and for the purpose described in connection with Figure 20.

Figure 22 shows a drift indicator wherein a pointer 60, mounted for actuation in the manner described for the pointer 49 is disposed to traverse a chart wherein air craft speed in miles per hour is plotted against drift ratio indicia in a manner to permit simple and convenient determination of the magnitude as well as the direction of the drift forces. This instrument may conveniently include the bulbs 54 arranged and connected for actuation as previously described.

Figures 17, 18, and 19 illustrate a somewhat conventionalized, convenient arrangement of combined air speed and drift indicators. As illustrated, a drum 61 is journaled for rotation transversely of a housing 62 and is circumferentially graduated about its midpoint to indicate air craft air speed in miles per hour. The drum 61 is suitably connected through a pinion 63 and toothed quadrant 64 with pressure-responsive bellows 65, or equivalent means, in operative association through tubes 66 with a pressure or pitot-static head is indicated in simple pressure type at 66' in a manner to cause speed-developed pressures to act through the bellows and linkage for rotation of the drum 61 and consequent positioning of the corresponding air speed indication in registration with a sight window 67 formed in the casing cover, a spring 65' serving to return the linkage and bellows to no-pressure position. A drift-indicating pointer 68, in all essential respects similar to the pointer 49, is operatively associated with coils 52 carried within the housing 62 and is disposed for oscillation transversely of said housing across the exposed face of the drum 61 and behind the sight window 67. The drum 61 carries drift ratio indicia aligned with each air speed designation and graduated through relative location so that a given drift ratio value indicated by the pointer 68 may be read against the simultaneously-exposed air speed reading for immediate translation into terms of drift in miles per hour. As indicated, the light bulbs 54 may be advantageously included in the combined instrument in the manner and for the purpose previously described.

Since many changes, variations, and modifications in the specific form, construction, arrangement, and operative combination of the elements shown and described may be had without departing from the spirit and principle of the invention, I wish to be understood as being limited solely by the scope of the appended claims, rather than by any details of the illustrative showing and foregoing description.

I claim as my invention—

1. In operative association with an aircraft, a shaft mounted for rotation in otherwise fixed, parallel relation with the craft flight axis, a mounting stem disposed for oscillation through a vertical arc laterally of said craft and perpendicularly associated with said shaft so that oscillations of said stem effect proportional rotation of said shaft, a pressure plate fixed to the outer end of said stem in constant parallel relation with said craft flight axis and thereby disposed for reaction through an arc in a plane perpendicular to the craft axis to air currents non-parallel with said axis, means yieldably engaging between said shaft and a point fixed to said craft to normally position said stem and plate in substantially vertical position, and means operable through rotation of said shaft to indicate direction and magnitude of the oscillatory pressure reactions of said plate at a remote point on said craft.

2. In operative association with an aircraft, a shaft mounted for rotation in otherwise fixed, parallel relation with the craft flight axis, a mounting stem disposed for oscillation through a vertical arc laterally of said craft and perpendicularly associated with said shaft so that oscillations of said stem effect proportional rotation of said shaft, a pressure plate fixed to the outer end of said stem in constant parallel relation with said craft flight axis and thereby disposed for reaction through an arc in a plane perpendicular to the craft axis to air currents non-parallel with said axis, means yieldably engaging between said shaft and a point fixed to said craft to normally position said stem and plate in substantially vertical position, means associated with said shaft to yieldably oppose rotation thereof and thereby limit erratic and vagrant oscillations of said stem, and means operable through rotation of said shaft to indicate direction and magnitude of the oscillatory pressure reactions of said plate at a remote point on said craft.

3. In operative association with an aircraft, means disposed in constant parallelism with the craft axis and mounted for oscillation through an arc laterally of said craft in response to air currents non-parallel with the craft flight axis, a shaft element rotatable by and in proportion to the oscillations of said means, resiliently-yieldable means engaging said shaft to position and normally maintain said pressure-responsive means in predetermined neutral relation with the aircraft, electrical means controlled through rotation of said shaft to regulate the flow of current through a circuit, and an indicating instrument responsive to current flow as controlled by said electrical means associated in the circuit controlled by said means at a point remote from the latter.

GATES E. UNDERWOOD.